United States Patent [19]
Nozawa

[11] Patent Number: 5,565,969
[45] Date of Patent: Oct. 15, 1996

[54] DEVELOPING DEVICE INCLUDING MEANS FOR RECOVERING CARRIER PARTICLES

[75] Inventor: Taizo Nozawa, Yokohama, Japan

[73] Assignee: Kabushiki Kaisha Toshiba, Kawasaki, Japan

[21] Appl. No.: 296,751

[22] Filed: Aug. 26, 1994

[30] Foreign Application Priority Data

Sep. 22, 1993 [JP] Japan ................................ 5-236873

[51] Int. Cl.$^6$ ................................................ G03G 15/095
[52] U.S. Cl. ........................ 355/269; 355/251; 355/296
[58] Field of Search ......................... 355/296, 251, 355/264, 269, 270, 303, 305; 118/657

[56] References Cited

U.S. PATENT DOCUMENTS

| | | | |
|---|---|---|---|
| 3,920,329 | 11/1975 | Dennie et al. | 118/657 X |
| 4,378,754 | 4/1983 | Rasekhi | 118/657 X |
| 4,457,257 | 7/1984 | Murakami et al. | 118/652 |
| 4,671,641 | 6/1987 | Kohyama | 355/251 |
| 5,187,529 | 2/1993 | Nakayama | 355/296 |

FOREIGN PATENT DOCUMENTS

58-55502  12/1983  Japan.

*Primary Examiner*—Nestor R. Ramirez
*Attorney, Agent, or Firm*—Limbach & Limbach

[57] ABSTRACT

A magnetic brush type developing device of the type used for electrophotography includes a developing roller and a carrier recovery roller, each of which includes a non-magnetic sleeve and a permanent magnet disposed within the non-magnetic sleeve. The developing roller is positioned adjacent to a photostatic body bearing an electrostatic latent image. During use the developing roller is rotated to transfer a two-component developing agent, comprised of a carrier and a toner, onto the photosensitive body. The carrier roller faces the photosensitive body and includes a permanent magnet having an orientation and a magnetic force that will cause the carrier component of the two-component developing agent to transfer from the photostatic body to the carrier roller during rotation of the carrier roller.

8 Claims, 5 Drawing Sheets

DEVELOPING DEVICE INCLUDING MEANS FOR RECOVERING CARRIER PARTICLES

BACKGROUND OF THE INVENTION

1. Field of the Invention

The present invention relates to a developing device, particularly, to a magnetic brush type developing device for electrophotography, in which an electrostatic latent image formed on a photosensitive body is developed with a developing agent of a two-component system consisting of a toner and a carrier.

2. Description of the Related Art

It was customary to use a carrier having small particle diameters in a magnetic brush type developing device included in an electrophotographic apparatus for improving the picture image quality. The carrier of small particle diameters markedly improves the picture image quality. However, the small carrier particles are attached to a photosensitive body included in the apparatus, giving rise to serious problems as pointed out below.

First of all, the total amount of the developing agent within the developing device is decreased with decrease in the carrier amount within the developing agent. As a result, an inconvenience is generated in the system for transferring the developing agent, leading to defective images.

What should also be noted is that, if the attached carrier is transferred onto a transfer paper sheet, defective images such as white dots are formed in the solid image portion. Also, the attached carrier on the transfer paper sheet gives detrimental effects to the fixing device. Further, where the output image having the carrier attached thereto is used as an original in, for example, an automatic original feeder included in a copying machine, the carrier is attached to the automatic original feeder so as to bring about an inconvenience in the system.

Further, where the carrier attached to the photosensitive body is not transferred onto a transfer paper sheet, the attached carrier is moved to reach a cleaning blade, with the result that the service life of the blade is shortened.

The problems pointed out above can be solved by removing and recovering the carrier attached to the photosensitive body before the transfer step. In fact, a carrier recovery device comprising a magnetic member is disposed between the developing section and the transfer section in some of conventional apparatuses so as to recover the attached carrier from the surface of the photosensitive body.

The conventional carrier recovery device comprises a magnetic member disposed in the vicinity of a developing roller having a predetermined magnetic field. The magnetic field of the magnetic member differs from that of the developing roller. The carrier attached to the photosensitive body is removed by the magnetic force of the magnetic member. What should be noted is that the magnetic fields produced by the developing roller and the magnetic member affect each other in a complex fashion depending on the positions of these roller and magnetic member, giving rise to difficulties as pointed out below.

A first difficulty is that the recovery device attracts the developing agent directly from the developing roller. The difficulty is generated where the magnetic force of the recovery apparatus is greater than that produced by the main magnetic pole or transfer magnetic pole of the developing roller. If the developing agent is directly attracted to the recovery apparatus, the developing agent is accumulated in the recovery device, leading to a marked reduction in the recovery rate. In some cases, the developing agent is not recovered at all. Further, if the accumulation is increased, the developing agent is locked between the developing roller and the recovery device, with the result that the developing agent drops from the developing device into the electrophotographic apparatus so as to impair the function itself of the electrophotographic apparatus.

A second difficulty relates to the transfer capability of the developing agent on the developing roller. Specifically, the magnetic force distribution on the developing roller is disturbed by the magnetic field generated from the magnetic member so as to prevent the developing roller from performing its proper function of promptly transferring the developing agent. In other words, the developing agent is not transferred satisfactorily, with the result that the output images are rendered thin or uneven. In some cases, stirring vanes mounted within the developing device are reproduced on the picture images.

To reiterate, it is known to the art to mount a carrier recovery device within the developing device included in an electrophotographic apparatus. In this case, however, the carrier recovery function is impaired or not performed at all depending on the mounting position of the recovery device. Further, the reproduced images are rendered unsatisfactory, or the function itself of the electrophotographic apparatus is impaired.

SUMMARY OF THE INVENTION

An object of the present invention is to provide a developing device capable of efficiently recovering the carrier attached to the photosensitive body without impairing the function of the electrophotographic apparatus.

According to a first aspect of the present invention, there is provided a developing device positioned facing to an image carrying member bearing an electrostatic latent image thereon and rotatable in one direction, a developing agent being supplied from the developing device to the electrostatic latent image on the image carrying member so as to develop the electrostatic latent image, comprising: a first non-magnetic sleeve having a developing agent carried on the surface, and rotated in a with-direction with respect to the rotating direction of the image carrying member so as to transfer the developing agent; a first magnetic pole mounted in the first non-magnetic sleeve and having a first polarity and a first magnetic force; a second magnetic pole arranged in the first non-magnetic sleeve and downstream of the first magnetic pole in the rotating direction of the first non-magnetic sleeve, and having a second polarity opposite to the first polarity; a second non-magnetic sleeve, which is rotated in against-direction with respect to the rotating direction of the image carrying member, positioned downstream of the first non-magnetic sleeve in the rotating direction of the image carrying member, and located in a region included by a first straight line joining the center of the first non-magnetic sleeve and the first magnetic pole and a second straight line joining the center of the first non-magnetic sleeve and the second magnetic pole.

According to a second aspect of the present invention, there is provided a developing device positioned facing to an image carrying member bearing an electrostatic latent image thereon and rotatable in one direction, a developing agent being supplied from the developing device to the electrostatic latent image on the image carrying member so as to develop the electrostatic latent image, comprising: a first non-magnetic sleeve having a developing agent carried on the surface, and rotated in a with-direction with respect to the rotating direction of the image carrying member so as transfer the developing agent; a first magnetic pole mounted in the first non-magnetic sleeve and having a first polarity and a first magnetic force; a second non-magnetic sleeve, which is rotated in against-direction with respect to the rotating direction of the image carrying member, positioned downstream of the first non-magnetic sleeve in a gravity direction; and a second magnetic pole arranged in the second non-magnetic sleeve, and having the first polarity and a second magnetic force smaller than the first magnetic force.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Let us describe a preferred embodiment of the present invention with reference to the accompanying drawings.

Figure 1:
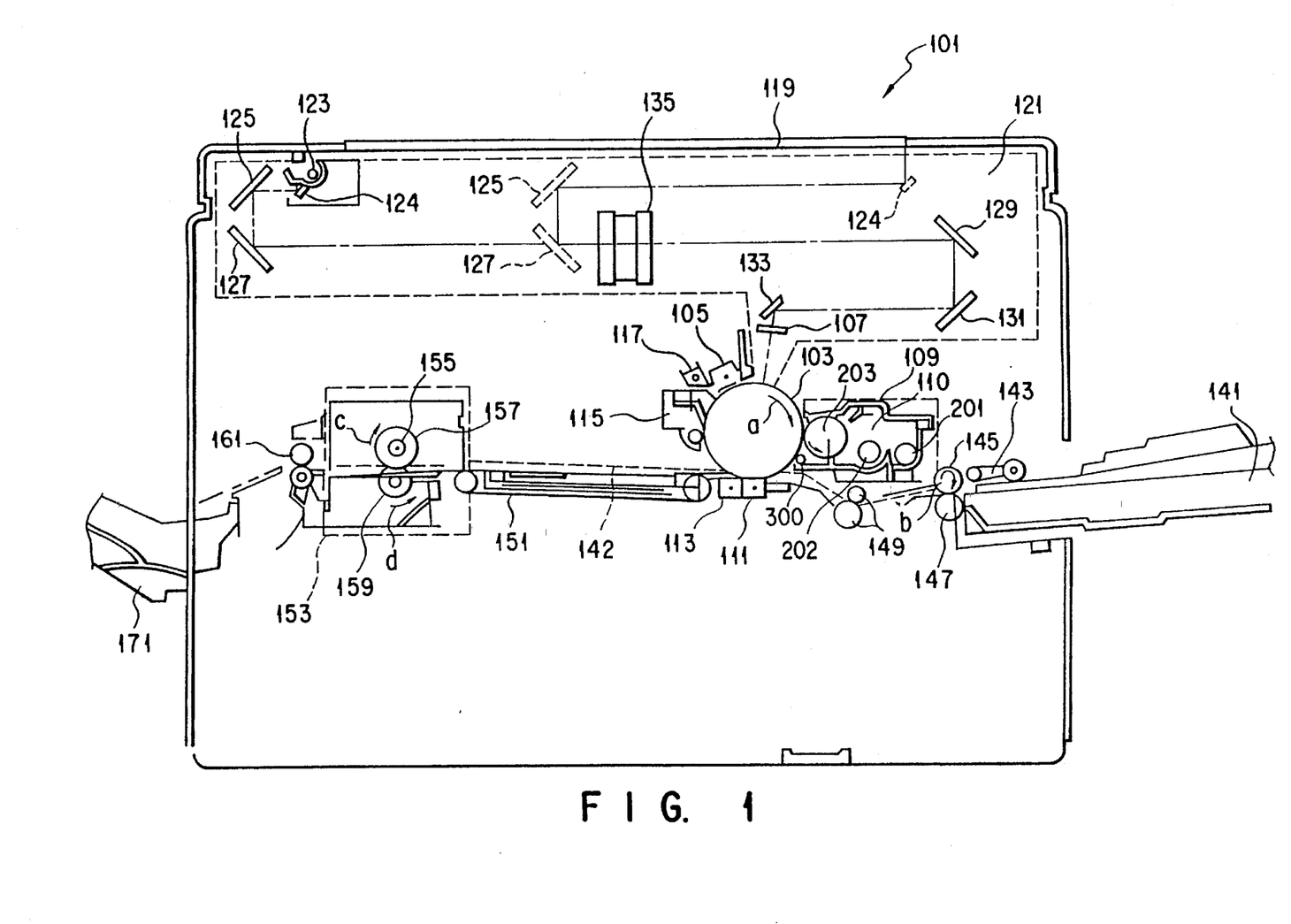
FIG. 1 schematically shows the construction of an electrophotographic apparatus having a developing device of the present invention incorporated therein.

FIG. 1 is a cross sectional view of a copying machine, which is an electrophotographic apparatus according to one embodiment of the present invention. As shown in the drawing, the copying machine comprises a copier body 101. A drum-like photosensitive body 103 is disposed as an image carrier in a central region of the copier body 101. The photosensitive body 103 is rotatable in a direction denoted by an arrow a and has a photoconductive layer formed on the surface.

A charger 105 for uniformly charging the surface of the photosensitive body 103 is disposed near the photosensitive body 103. Also, a slit glass 107 for exposing through the slit the charged surface of the photosensitive body 103 to the light emitted from the image of an original is disposed downstream of the charger 105 in the rotating direction of the photosensitive body 103. Further, a developing device 109, by which a toner is attached to the electrostatic latent image on the photosensitive body 103 so as to develop the latent image, is disposed downstream of the slit glass 107 in the rotating direction of the photosensitive body 103. A developing agent prepared by mixing a carrier with a toner 110 is housed in the developing device 109.

Figure 2:
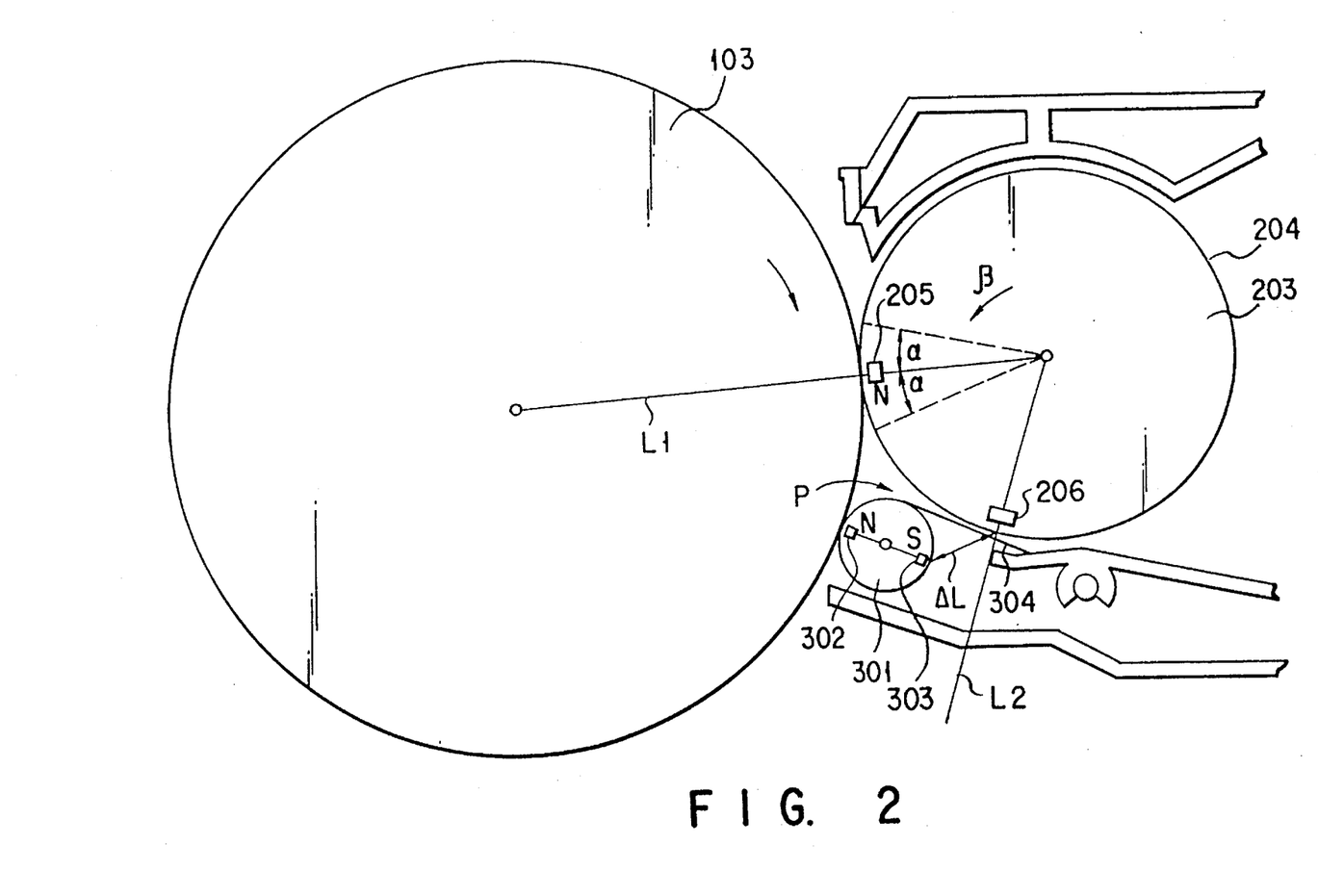
FIG. 2 schematically shows the construction of a developing device according to one embodiment of the present invention.

Disposed within the developing device 109 are a stirring roller 201, a supply roller 202, and a magnet roller 203. The developing agent is stirred by the stirring roller 201 so as to charge frictionally the developing agent. The developing agent is supplied by the supply roller 202 to the magnet roller 203 which is rotatable in a direction denoted by an arrow and positioned very close to the surface of the photosensitive body 103. As shown in FIG. 2, the magnet roller 203 comprises a non-magnetic sleeve 204 and S- and N-poles alternately fixed within the cylindrical body 203a in the rotating direction of the roller.

A carrier recovery device 300, a transfer device 111 and a peeling device 113 are arranged in this order downstream of the developing device 109 in the rotating direction of the photosensitive drum 103. As described herein later, the carrier attached to the photosensitive body 103 is magnetically attracted to the carrier recovery device 300 so as to be recovered within the developing device 109. The toner image formed by the developing device 109 is transferred by the transfer device 111 onto a copying paper sheet. Further, the copying paper sheet pushed against the surface of the photosensitive body 103 is peeled by the peeling device 113 from the photosensitive body 103.

A cleaning device 115 is arranged downstream of the peeling device 113 in the rotating direction of the photosensitive body 103. The toner 110 remaining on the photosensitive body 103 after the transfer step is removed by the cleaning device 115. Further, a discharge device 117 for lowering the potential of the photosensitive body 103 is mounted between the cleaning device 115 and the charger 105.

The copier body 101 is provided with a platen glass 119, on which an original is disposed, and an optical system 121 serving to apply light to the original on the platen glass 119 and to guide the light reflected from the original to the surface of the photosensitive body 103. The optical system 121 comprises a lamp 123 as a light source, mirrors 124, 125, 127, 129, 131 and 133 for reflecting the light emitted from the light source, and a lens unit 135 for forming an image from the reflected light.

The lamp 123 and the mirror 124 are movable below the platen glass 119. The mirrors 125 and 127 are also movable at a speed half the moving speed of the lamp 123 so as to keep constant the length of the optical path. The light reflected from the mirror 133 is guided through the slit glass 107 to reach the surface of the photosensitive body 103.

A manual feeding tray 141 for manually supplying a copying paper sheet to the copying machine is detachably mounted through a side wall in a central portion of the copier body 101. Also, a pick-up roller 143 for taking up the copying paper sheet from the tray 141 is mounted within the copier body 101 upward of the tip portion of the tray 141.

A discharge tray 171 onto which a copied paper sheet is discharged is mounted through another side wall in a central portion of the copier body 101. These trays 141 and 171 are mounted on the opposite side walls of the copier body 101.

A transfer path 142 for transferring paper sheets is formed between these trays 141 and 171, as denoted by a dotted line in FIG. 1.

Two pairs of rollers are mounted in an upstream portion of the transfer path 142, a first pair of rollers consisting of a paper feeding roller 145 and a separating roller 147, with a second pair of rollers consisting of upper and lower resist rollers 149 positioned downstream of the first pair of rollers. These paper feeding roller 145 and separating roller 147 are positioned adjacent the manual feeding tray 141. The paper feeding roller 145 is rotatable in a direction denoted by an arrow b. The copying paper sheet taken up by the pick-up roller 143 from the tray 141 is transferred by the roller 145 so as to be held between the second pair of the resist rollers 149.

The separating roller 147 is positioned downward of the paper feeding roller 145 and is in contact with the roller 145. Where a plurality of copying paper sheets are taken up by the pick-up roller 143, the separating roller 147 is rotated to bring the extra paper sheets back to the manual feeding tray 141. In other words, the separating roller 147 and the paper feeding roller 145 are rotated in the same direction, i.e., in the clockwise direction as shown in the drawing. Where a single paper sheet is supplied from the pick-up roller 143, the separating roller 147 is rotated in a direction opposite to the rotating direction of the paper feeding roller 145. The tip of the copying paper sheet supplied from the paper feeding roller 145 strikes against the resist rollers 149, with the result that the copying paper sheet is correctly positioned. Then, the copying paper sheet is fed between the photosensitive body 103 and the transfer device 111 so as to permit the toner image on the photosensitive body 103 to be transferred onto the copying paper sheet.

The transfer device 111 and the peeling device 113 are arranged in a central portion of the transfer path 142, and a transfer belt 151 for transferring the paper sheet bearing the toner image is arranged downstream of the peeling device 113. Further, a fixing device 153 is mounted in a downstream portion of the transfer path 142. The toner on the copying paper sheet is heated under pressure in the fixing device 153 so as to fix the toner image to the copying paper sheet. To be more specific, the fixing device 153 is provided with a heat roller 157 rotatable in a direction denoted by an arrow c and a pressure roller 159 rotatable in a direction denoted by an arrow d. A heat lamp 155 as a heating element is disposed within the heat roller 157. The surface of the heat roller 157 is formed of a metallic material exhibiting a high heat conductivity. On the other hand, the surface of the pressure roller 159 is formed of an elastic rubbery material. These heat roller 157 and pressure roller 159 are in contact with each other such that the elastic surface of the pressure roller 159 is pressed against the surface of the heat roller 157.

Further, a paper discharge roller 161 for discharging the copied paper sheet onto the discharge tray 171 is arranged downstream of the transfer path 142.

The copying machine of the construction described above is operated as follows. In the first step, the surface of the photosensitive body 103 is uniformly charged by corona discharge performed by the charger 105. Then, the lamp 123 included in the optical system 121 is moved below the original glass 119 having an original disposed thereon so as to irradiate the original with the light emitted from the lamp 123. During movement of the lamp 123, the light emitted from the lamp 123 is reflected so as to be guided to the lens unit 135. Then, the reflected light is inverted by the lens unit 135, and the inverted light is guided to the photosensitive body 103 through the slit glass 107. When the photosensitive body 103 is exposed to the light, the electrical charge on the surface of the photosensitive body 103 is lost so as to form an electrostatic latent image.

The toner 110 is stirred by the stirring roller 201 within the developing device 109, with the result that the toner 110 is electrostatically charged by friction. The toner thus charged and the carrier are supplied by the supply roller 202 to the magnet roller 203. The charged toner and the carrier supplied to the magnet roller 203 form a magnetic brush because of the presence of magnetic lines of force extending between the S- and N-poles formed in the magnet roller 203. The carrier is kept magnetically pulled to the magnet roller 203. On the other hand, the charged toner 110 is positioned to electrostatically attract the carrier.

When the magnetic brush and the electrostatic latent image formed on the photosensitive body 103 are positioned close to each other in accordance with rotation of the magnet roller 203 and the photosensitive body 103, the toner 110 is pulled away from the carrier by a stronger electrostatic attractive force of the electrostatic latent image, with the result that the toner 110 is electrostatically attached to the electrostatic latent image so as to form a toner image. In this developing step, a voltage applying device (not shown) is operated to apply a developing bias to each of the magnet roller 203 and the photosensitive body 103 so as to prevent an undesired toner from being attached to the photosensitive body 103.

On the other hand, the copying paper sheet disposed in the manual feeding tray 141 is taken up by the pickup roller 143 and, then, transferred to the resist rollers 149 by the feeding roller 145. Where a plurality of copying paper sheets have been taken up by the pick-up roller 143, the extra paper sheets are brought back to the tray 141 by the rotation of the separating roller 147 so as to permit only one paper sheet to be transferred to the resist rollers 149, as described previously. The tip of the copying paper sheet supplied from the paper feeding roller 145 strikes against the resist rollers 149, with the result that the copying paper sheet is correctly positioned. Then, the copying paper sheet is fed between the photosensitive body 103 and the transfer device 111 so as to permit the toner image on the photosensitive body 103 to be transferred onto the copying paper sheet. The copying paper sheet bearing the toner image is peeled by the peeling device 113 from the surface of the photosensitive body 103 and, then, transferred by the transfer belt 151 into the fixing device 153.

As described previously, the fixing device 153 comprises the heat roller 157 having the heat lamp 155 housed therein and the pressure roller 159 pressed against the heat roller 157. These heat roller 157 and pressure roller 159 are rotated in opposite directions as denoted by arrows c and d. The copying paper sheet bearing the toner image is passed between these rollers 157 and 159 such that the toner image is in contact with the surface of the heat roller 157. Since the elastic surface of the pressure roller 159 is pressed against the surface of the heat roller 157, the heat generated from the heat lamp 155 is efficiently transmitted to fuse the toner image formed on the copying paper sheet. In addition, the fused toner is allowed to permeate into clearances between fibers of the paper sheet so as to fix the toner image to the copying paper sheet and, thus, to finish the copying operation. Finally, the copied paper sheet is discharged via the discharge roller 161 onto the discharge tray 171.

As already described, the toner housed in the developing device 109 is attached to the electrostatic latent image formed on the photosensitive body 103 to form a toner image. In this developing step, it is desirable for the toner alone contained in the developing agent to be attached to the electrostatic latent image. However, it is unavoidable for the carrier contained in the developing agent to be partly attached to the electrostatic latent image depending on the potential contrast $\Delta V$, which is equal to $(V_0-B_B)/D$, where $V_0$ is the surface potential of the photosensitive body, $V_B$ is the developing bias, and D is the clearance gap between the two, as well as on the centrifugal force $F_r$ and the properties of the developing agent, carrier and toner.

It is substantially impossible to eliminate completely the carrier attaching phenomenon described above, though the amount of the carrier attached to the electrostatic latent image can be decreased. Particularly, where the carrier is in the form of fine particles, the magnetic coupling force between the developing roller 203 and the carrier is very weak, with the result that the carrier is likely to be much affected by the potential contrast $\Delta V$, the centrifugal force $F_r$ of the developing roller, etc. It follows that the carrier tends to be attached to the electrostatic latent image in an increased amount. As already described, the electrophotographic system is much affected adversely by the carrier attaching phenomenon.

To prevent the difficulties caused by the carrier attaching phenomenon, a carrier recovery device 300 is provided in the present invention to remove and recover the carrier attached to the photosensitive body 103 before the transfer step. The recovery device 300 comprises a non-magnetic cylindrical body 301 and a permanent magnet roll fixed within the non-magnetic cylindrical body 301, said permanent magnetic roll having magnetic poles 302 and 303. In accordance with rotation of the non-magnetic cylindrical body 301, the carrier attached to the photosensitive body is magnetically transferred to and held by the surface of the non-magnetic cylindrical body 301. The carrier held by the non-magnetic cylindrical body 301 is scratched off by a blade 304 so as to be recovered in the developing device.

FIG. 2 is a cross sectional view showing the developing device according to one embodiment of the present invention. It should be noted that the carrier contained in the developing agent is attached to the photosensitive body 103 in the developing step in the vicinity of the main pole 205 of the developing roller 203. The carrier thus attached to the photosensitive body is moved to reach a region near the main pole 302 of the recovery device 300 in accordance with rotation of the photosensitive body 103. Then, the carrier on the photosensitive body 103 is magnetically attracted toward the recovery device 300 by the magnetic force of the main pole 302 so as to be attached to the surface of the non-magnetic cylindrical body 301 of the recovery device 300. Further, the carrier is moved to a transfer pole 303 of the recovery device 300 in accordance with rotation of the recovery device and, then, scratched off by the blade 304 so as to be recovered in the developing device. Each of the main pole 302 and the transfer pole 303 is fixed to the developing device and positioned within the rotatable non-magnetic cylindrical body.

Figure 3A:
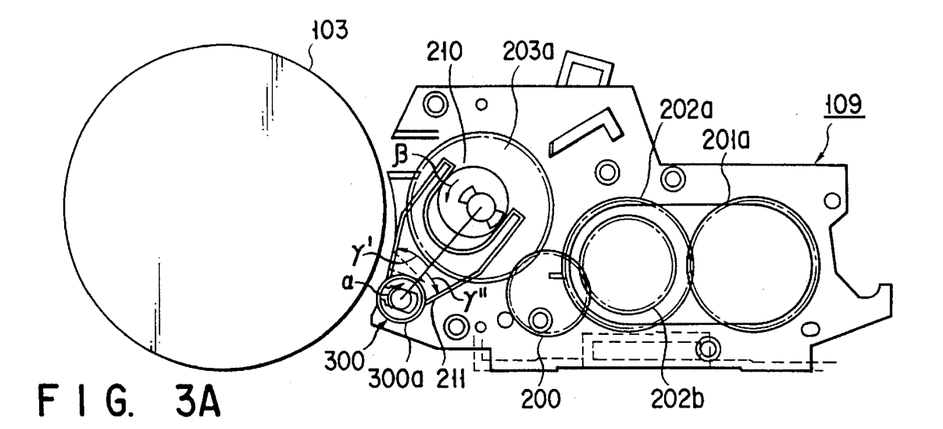
FIGS. 3A to 3C schematically show the driving mechanism of rollers housed in a developing device.
Figure 3B:
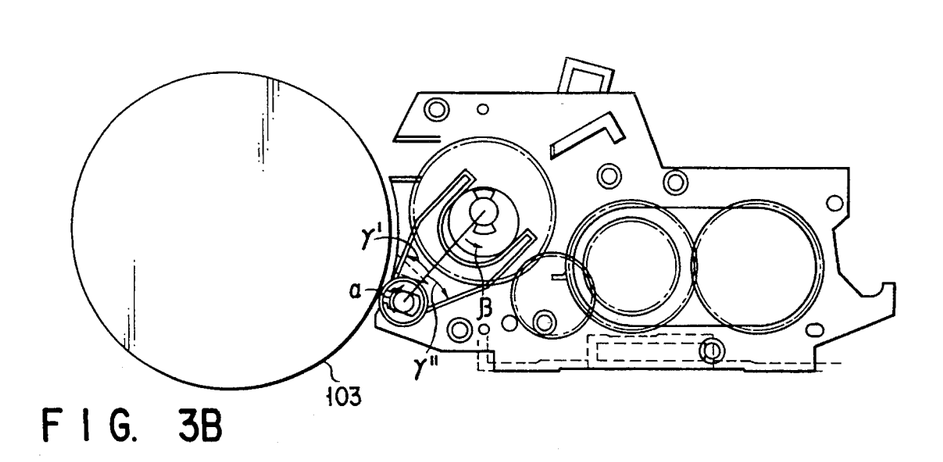
Figure 3C:
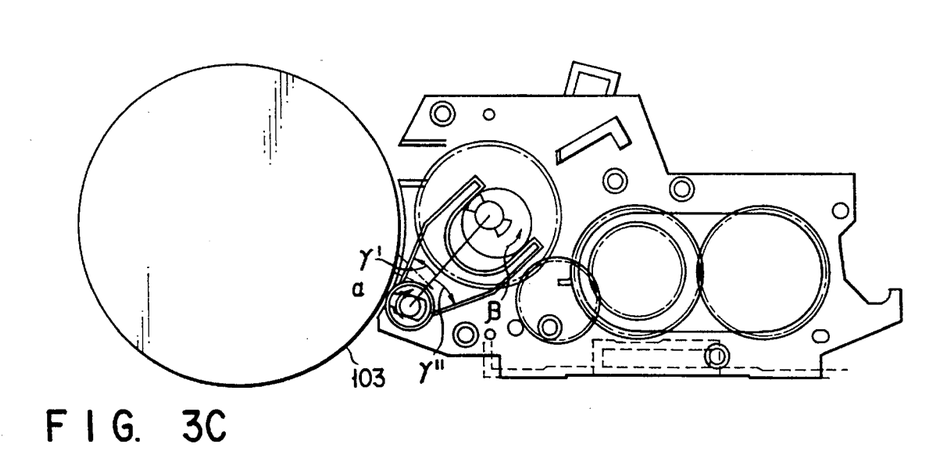

FIGS. 3A to 3C show the driving mechanisms of the rollers housed in the developing device 109. As shown in the drawings, housed in the developing device 109 are a developing roller gear 203a connected to the rotating shaft of the developing roller 203, first and second supply roller gears 202a and 202b connected to the rotating shaft of the supply roller 202, a stirring roller gear 201a connected to the rotating shaft of the stirring roller 201, and a driving gear 200 for transmitting the rotating force generated from a driving source such as a motor (not shown). The driving gear 200 is engaged with the developing roller gear 203a and with the second supply roller gear 202b at a position differing from the engaging position with the developing roller gear 203a. Further, the first supply roller gear 202a is engaged with the stirring roller gear 201a. It follows that the rotating force of the driving gear 200 is transmitted to each of the developing roller gear 203a, the first and second supply roller gears 202a, 202b, and the stirring roller gear 201a so as to rotate the developing roller 203, the supply roller 202 and the stirring roller 201.

An eccentric cam 210 is connected to the rotating shaft of the developing roller 203. The entire region of the eccentric cam 210 interfits into a recess of a cam follower 211. A one-way clutch 300a, which is connected to the rotating shaft of the recovery roller 300, is mounted in an edge portion of the cam follower 211 opposite to the edge portion at which the cam 210 is engaged with the cam follower 211. When the developing roller 203 is rotated by the driving mechanism, the eccentric cam 210 is rotated in a direction denoted by an arrow β in FIGS. 3A to 3C, with the result that the cam follower 211 is swung about the rotating shaft of the recovery roller 300, as denoted by arrows γ' and γ". When the cam follower 211 is swung in the direction of γ", the swinging force is transmitted by the one-way clutch 300a to the rotating shaft of the recovery roller 300, with the result that the recovery roller 300 is rotated in a direction denoted by an arrow a. When the cam follower 211 is swung in the direction of γ', however, the swinging force of the cam follower 211 is not transmitted by the one-way clutch 300 to the recovery roller 300. It follows that the recovery roller 300 is rotated in the direction denoted by the arrow in accordance with rotation of the developing roller 203.

The developing roller 203 also comprises a non-magnetic cylindrical body 23 which is rotatable. A plurality of magnetic poles, i.e., N- and S-poles, are fixed to the developing device and positioned within the cylindrical body. These N- and S-poles are arranged in a predetermined order in the circumferential direction of the cylindrical body. Of these magnetic poles, the pole positioned to face the photosensitive body acts as a main pole serving to supply the developing agent to the photosensitive body, with the other magnetic poles acting as transfer poles serving to transfer the developing agent to the main pole. Positioned within the cylindrical body are 5 or 7 magnetic poles. In other words, the developing roller 203 is of 5-pole type or 7-pole type.

For enabling the recovery device 300 to perform a satisfactory function, it is important to determine appropriately the polarity, magnetic force, relative angular position and relative location for each of the main pole 205 of the developing roller 203, the transfer pole 206 adjacent to the main pole 205 in the rotating direction of the non-magnetic cylindrical body surrounding these poles 205 and 206, the main pole 302 of the recovery device and the transfer pole 303 of the recovery device.

To be more specific, the main pole 205 of the developing roller 203 should be equal in polarity to the main pole 302 of the recovery device. Otherwise, the recovery device 300 directly pulls the developing agent from the developing roller 203.

Figure 4:
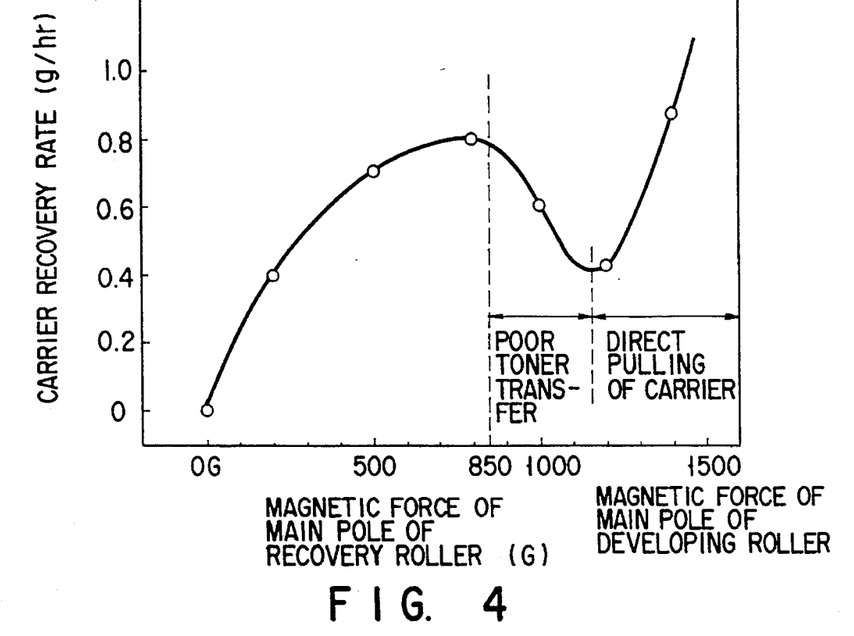
FIG. 4 is a graph showing the change in the carrier recovery rate relative to the magnetic force of a main pole of a recovery roller.

It is important to determine appropriately the magnetic force for each of the main pole 205 of the developing roller 203 and the main pole 302 of the recovery roller 300. In this embodiment, the magnetic force of the main pole 205 of the developing roller 203 is set at 1050±50 G (Gauss). FIG. 4 is a graph showing experimental data relating to the change in the carrier recovery rate relative to the magnetic force of the main pole 302 of the recovery roller 300. As shown in the graph, the carrier recovery rate was zero when the magnetic force of the main pole 302 was zero. The carrier recovery rate was increased with increase in the magnetic force, reaching a peak when the magnetic force of the main pole 302 was set about 800 G. Then, the carrier recovery rate was decreased with further increase in the magnetic force of the main pole 302 to reach about 1050 G, which is equal to the magnetic force of the main pole 205 of the developing roller 203. Further, the carrier recovery rate was rapidly increased when the magnetic force of the main pole 302 was further increased in a region exceeding 1050 G.

As apparent from the experimental data, the carrier recovery rate is rapidly increased, if the magnetic force of the main pole 302 of the recovery roller 300 is larger than that of the main pole 205 of the developing roller 203. This is because the main pole 302 of the recovery roller directly pulls the carrier from the developing position. To overcome the difficulty, the magnetic force of the main pole of the recovery roller must be set smaller than that of the main pole of the developing roller. Where the magnetic force of the main pole of the recovery roller is smaller than that of the main pole of the developing roller, the main pole 302 of the recovery roller 300 is considered to pull the carrier from only the photosensitive drum 103. However, the carrier recovery rate is decreased where the magnetic force of the main pole 302 exceeds about 850 G to reach about 1050 G, which is equal to the magnetic force of the main pole 205 of the developing roller 203. Where the magnetic force of the main pole 302 of the recovery roller 300 falls within a range of between 850 G and 1050 G, the difference in magnetic force between the main pole 302 and the main pole 205 of the developing roller 203 is so small that a balanced condition is established in which the carrier is not attracted to any of the main poles 302 and 205. As a result, the carrier is accumulated in the region P shown in FIG. 2, leading to a marked decrease in the toner transfer capability. It follows that it is necessary to set the magnetic force of the main pole 302 of the recovery roller 300 at about 850 G, which is about 15% smaller than the magnetic force (1050±50 G) of the main pole 205 of the developing roller 203.

Figure 5:
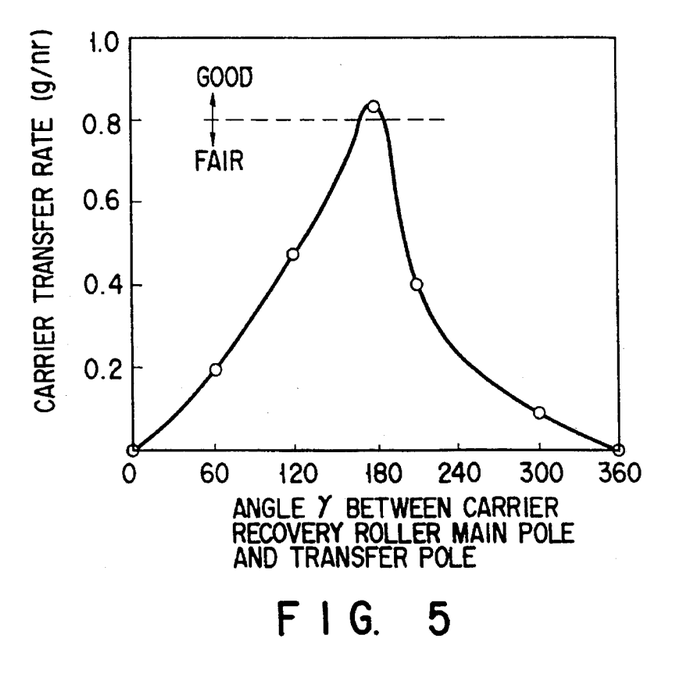
FIG. 5 is a graph showing the carrier transfer rate relative to angle γ.
Figure 6:
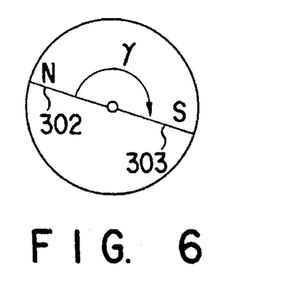
FIG. 6 schematically shows angle γ made between a main pole and a transfer pole in a recovery roller.

The carrier recovered by the main pole 302 of the recovery roller 300 is transferred again into the developing device. An angle γ made between the main pole 302 and the transfer pole 303 within the recovery roller 300 is an important factor for facilitating the carrier transfer into the developing device. FIG. 5 is a graph showing the carrier transfer rate and the angle γ shown in FIG. 6 noted above. As shown in the graph, the carrier transfer rate is increased with increase in the distance between the main pole 302 and the transfer pole 303, reaching the highest transfer rate in the case where these main pole and transfer pole are most apart from each other, i.e., angle γ of 180°. To permit the recovered carrier to be transferred smoothly into the developing device 109, the carrier recovery rate should be at least 0.8 g/hr. To meet this requirement, the angle γ made between the main pole 302 and the transfer pole 303 should be 180°±10°, as apparent from the experimental data given FIG. 5.

A distance between the transfer pole 303 of the recovery roller 300 and the transfer pole 206 of the developing roller 203 is also an important factor for facilitating the carrier transfer. It should be noted that the transfer pole 206 of the developing roller 203 should be positioned downstream, in the rotating direction of the developing roller, of a straight line joining the center of the developing roller 203 and the transfer pole 303 of the recovery roller 300. In this case, the carrier recovered by the recovery roller 300 and transferred from the main pole 302 to the transfer pole 303 can be recovered in the developing device by the function of the transfer pole 206 of the developing roller 203. In other words, the recovery roller 300 should be positioned within an angular region defined by the main pole 205 and the transfer pole 206 of the developing roller 203, i.e., within the angle β' shown in FIG. 2. To be more specific, the recovery roller 300 should be positioned within the region defined between a straight line L1 passing through the center of the developing roller 203 and the main pole 205 of the developing roller 203 and another straight line L2 passing through the center of the developing roller 203 and the transfer pole 206 of the developing roller 203, as shown in FIG. 2.

Figure 7:
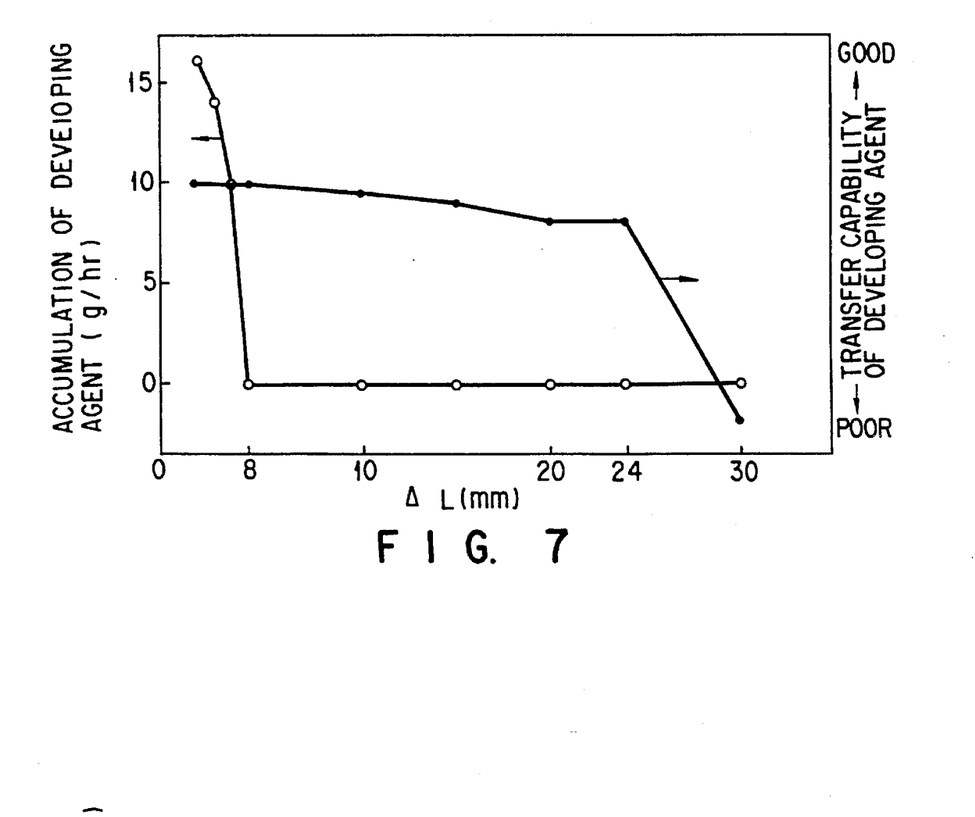
FIG. 7 is a graph showing the accumulation rate and transfer capability of a developing agent relative to a length ΔL.

FIG. 7 is a graph showing how the accumulating amount and the transfer capability of the developing agent are affected by a linear distance ΔL between the transfer pole 206 of the developing roller 203 and the transfer pole 303 of the recovery roller 300. As seen from the graph, the accumulating amount of the developing agent is rapidly increased if the linear distance ΔL is less than 8 mm, indicating that the recovering efficiency of the developing agent is markedly lowered. It is also seen that the transfer capability of the developing agent is rapidly lowered if the linear distance ΔL exceeds 24 mm. It follows that it is desirable to set the Linear distance ΔL to fall within a range of between 8 mm and 24 mm in view of the recovering efficiency and transfer capability of the developing agent.

In the embodiment shown in FIG. 2, the magnetic force, relative position and angle of each magnetic pole are set as follows:

|  | Magnetic force (G) | Position and angle |
|---|---|---|
| Main pole 205 | 1050 ± 50 | α = +1° ± 2° |
| Transfer pole 206 | 850 | β = 298° (ΔL = 10 mm) |
| Main pole 302 drum | 850 | facing photosensitive |
| Transfer pole 303 | 700 | γ = 180 ± 10° |

Figure 8:
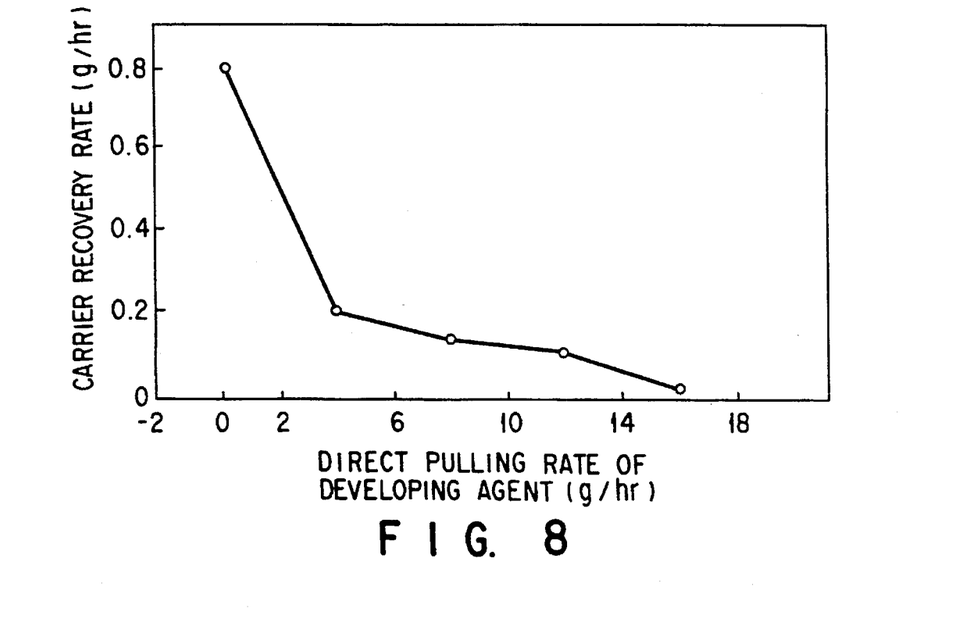
FIG. 8 is a graph showing the relationship between the developing agent supply rate and the carrier recovery rate.

FIG. 8 is a graph showing the relationship between the rate at which the recovery device directly pulled the developing agent from the developing roller and the carrier recovery rate. It is seen that the carrier recovery rate is lowered with increase in the rate at which the developing agent is directly pulled by the recovery device from the developing roller. In other words, the carrier recovery efficiency of the recovery device is lowered if the developing agent is pulled by the recovery device directly from the developing roller.

In the embodiment shown in FIG. 2, the gap between the recovery device 300 and the photosensitive body 103 is set at 0.4 mm.

As described above, the developing device of the present invention comprises a carrier recovery means having a non-magnetic cylindrical body positioned downstream of the developing section in the rotating direction of the photosensitive body and a permanent magnet fixed within the non-magnetic cylindrical body. The non-magnetic cylindrical body is rotated in a direction equal to the rotating direction of the photosensitive body. The permanent magnet has a second main pole equal in polarity to the first main pole of the developing means and positioned to face the photosensitive body, and a second transfer pole opposite in polarity to the second main pole. The second main pole serves to magnetically hold the carrier. On the other hand, the second transfer pole serves to transfer the carrier held by the second main pole. It should be noted that the magnetic force of the second main pole is weaker than that of any of the first main pole of the developing means and the first transfer pole positioned adjacent to the first main pole. Where the magnetic force of the main pole of the carrier recovery means is controlled in this fashion, the carrier recovery means, which exhibits a predetermined carrier-pulling force, is prevented from pulling the developing agent directly from the developing means. It follows that the carrier recovery means is enabled to perform its carrier recovery function satisfactorily.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A developing device positionable facing an image carrying member bearing an electrostatic latent image thereon and being rotatable in a rotating direction, the developing device for supplying a developing agent to said electrostatic latent image on said image carrying member, the developing device comprising:

a first non-magnetic sleeve having a surface for carrying a developing agent, and being rotatable in a direction opposite to said rotating direction of said image carrying member so as to transfer the developing agent;

a first magnetized member with a first magnetic pole mounted in said first non-magnetic sleeve and having a first polarity and a first magnetic force;

a second magnetized member with a second magnetic pole mounted in the first non-magnetic sleeve and positioned next to said first magnetic pole in the rotating direction of the first non-magnetic sleeve, and having a second polarity opposite to said first polarity, the first magnetic pole being closer to the image carrying member than any other magnetic pole within the first non-magnetic sleeve;

a second non-magnetic sleeve, rotatable in the same rotating direction as the image carrying member, the second non-magnetic sleeve positioned downstream of the first non-magnetic sleeve in the rotating direction of the image carrying member, and located between a first straight line joining the center of said first non-magnetic sleeve and said first magnetic pole and a second straight line joining the center of the first non-magnetic sleeve and said second magnetic pole; and a third magnetized member with a third magnetic pole arranged in said second non-magnetic sleeve, and having said first polarity and a second magnetic force smaller than the first magnetic force.

2. The developing device according to claim 1, which further comprises a fourth magnetic pole arranged in said second non-magnetic sleeve, and having said second polarity.

3. A developing device positioned facing an image carrying member bearing an electrostatic latent image thereon and being rotatable in a rotating direction, the developing device for supplying a developing agent to said electrostatic latent image on said image carrying member, the developing device comprising:

a first non-magnetic sleeve having a surface for carrying a developing agent, and being rotatable in a rotating direction opposite to said rotating direction of said image carrying member so as to transfer the developing agent;

a first magnetized member with a first magnetic pole mounted in said first non-magnetic sleeve and having a first polarity and a first magnetic force;

a second magnetized member with a second magnetic pole mounted in the first non-magnetic sleeve and positioned next to said first magnetic pole in the rotating direction of the first non-magnetic sleeve, and having a second polarity opposite to said first polarity, the first magnetic pole being closer to the image carrying member than any other magnetic Dole within the first non-magnetic sleeve;

a second non-magnetic sleeve, rotatable in the same rotating direction as the image carrying member, positioned downstream of the first non-magnetic sleeve in a gravity direction, and located between a first straight line joining the center of said first non-magnetic sleeve and said first magnetic pole and a second straight line joining the center of the first non-magnetic sleeve and said second magnetic pole; and a third magnetized member with a third magnetic pole arranged in said second non-magnetic sleeve, and having said first polarity and a second magnetic force smaller than the first magnetic force.

4. A developing device positioned facing an image carrying member bearing an electrostatic latent image thereon and being rotatable in a rotating direction, the developing device for supplying a developing agent to said electrostatic latent image on said image carrying member, the developing device comprising:

a first non-magnetic sleeve having a developing agent carried on the surface, and the first non-magnetic sleeve rotatable in a rotating direction opposite to the rotating direction of the image carrying member;

a first magnetized member with a first magnetic pole mounted in said first non-magnetic sleeve and at a position relative to the image carrying member that is closer to the image carrying member than any other magnetic pole within the first non-magnetic sleeve;

a second magnetized member with a second magnetic pole mounted in the first non-magnetic sleeve and positioned next to said first magnetic pole in the rotating direction of the first non-magnetic sleeve; and a second non-magnetic sleeve rotating in the same rotating direction as the image carrying member, positioned downstream of the first non-magnetic sleeve in the rotating direction of the image carrying member, and located between a first straight line joining the center of said first non-magnetic sleeve and said first magnetic pole and a second straight line joining the center of the first non-magnetic sleeve and said second magnetic pole.

5. A developing device positioned facing an image carrying member which is rotatable in a first direction and which bears an electrostatic latent image thereon, the developing device for supplying a developing agent to said electrostatic latent image on said image carrying member, the developing device comprising:

a first non-magnetic sleeve having a surface for carrying a developing agent, the first non-magnetic sleeve rotatable in a second direction opposite to the first direction so as to transfer the developing agent;

a first magnetic pole mounted in said first non-magnetic sleeve and having a first polarity and a first magnetic force;

a second magnetic pole mounted in the first non-magnetic sleeve and next to the first magnetic pole in the direction of rotation of the first non-magnetic sleeved the second magnetic pole having a second polarity opposite to said first polarity;

a second non-magnetic sleeve, rotatable in the first direction and positioned downstream of the first non-magnetic sleeve in the direction of rotation of the image carrying member, and located between a first straight line joining the center of said first non-magnetic sleeve and said first magnetic pole and a second straight line joining the center of the first non-magnetic sleeve and said second magnetic pole;

a third magnetic pole arranged in said second non-magnetic sleeve, and having said first polarity and a second magnetic force smaller than the first magnetic force; and a fourth magnetic pole arranged in said second non-magnetic member, and having said second polarity, wherein a linear distance $\Delta L$ between said second magnetic pole and the fourth magnetic pole is 8 mm $\leq \Delta L \leq$ 24 mm.

6. The developing device according to claim 5, wherein an angle $\gamma$ made between a straight line joining the center of the second non-magnetic sleeve and the third magnetic pole and another straight line joining the center of the second non-magnetic sleeve and the fourth magnetic pole is $170° < \gamma < 190°$.

7. A developing device positioned facing an image carrying member which is rotatable in a first direction and which bears an electrostatic latent image thereon, the developing device for supplying a developing agent to said electrostatic latent image on said image carrying member, the developing device comprising:

a first non-magnetic sleeve having a surface for carrying a developing agent, the first non-magnetic sleeve rotatable in a second direction opposite to the first direction so as to transfer the developing agent;

a first magnetic pole mounted in said first non-magnetic sleeve and having a first polarity and a first magnetic force;

a second magnetic pole mounted in the first non-magnetic sleeve and next to the first magnetic pole in the direction of rotation of the first non-magnetic sleeve, and having a second polarity opposite to said first polarity;

a second non-magnetic sleeve, rotatable in the first direction and positioned downstream of the first non-magnetic sleeve in the direction of rotation of the image carrying member, and located between a first straight line joining the center of said first non-magnetic sleeve and said first magnetic pole and a second straight line joining the center of the first non-magnetic sleeve and said second magnetic pole;

a third magnetic pole arranged in said second non-magnetic sleeve, and having said first polarity and a second magnetic force smaller than the first magnetic force;

a cam connected to a rotating axis of said first non-magnetic sleeve, a cam follower in contact with said cam, and a one-way clutch connected to a rotation axis of said second non-magnetic sleeve, for transmitting a movement of said cam follower to the rotation axis of said second non-magnetic sleeve.

8. A developing device positioned facing an image carrying member which is rotatable in a first direction and which bears an electrostatic latent image thereon, the developing device for supplying a developing agent to said electrostatic latent image on said image carrying member, comprising:

a first non-magnetic sleeve having a surface for carrying a developing agent and being rotatable in a second direction opposite to the first direction so as to transfer the developing agent;

a first magnetic pole mounted in said first non-magnetic sleeve and having a first polarity and a first magnetic force;

a second non-magnetic sleeve, rotatable in the first direction and positioned downstream of the first non-magnetic sleeve in a gravity direction;

a second magnetic pole arranged in said second non-magnetic sleeve, and having said first polarity and a second magnetic force smaller than the first magnetic force; and a cam connected to a rotating axis of said first non-magnetic sleeve, a cam follower in contact with said cam, and a one-way clutch connected to the rotating axis of said second non-magnetic sleeve, for transmitting a movement of said cam follower to the rotation axis of said second non-magnetic sleeve.

* * * * *